United States Patent [19]

Cosby

[11] Patent Number: 5,107,682
[45] Date of Patent: Apr. 28, 1992

[54] MAXIMUM AMBIENT CYCLE

[76] Inventor: Thomas L. Cosby, 1639 E. 84th Pl., Chicago, Ill. 60617

[21] Appl. No.: 462,723

[22] Filed: Jan. 9, 1990

Related U.S. Application Data

[63] Continuation-in-part of Ser. No. 940,449, Dec. 11, 1986, abandoned.

[51] Int. Cl.⁵ .............................................. F01K 25/02
[52] U.S. Cl. ........................................ 60/650; 60/682; 62/402
[58] Field of Search .................. 60/641.1, 643, 645, 60/650, 682, 656, 68, 526; 237/2 B; 62/402

[56] References Cited

U.S. PATENT DOCUMENTS 4,311,010  1/1982  Wurmfeld ............................ 60/651

*Primary Examiner*—Henry A. Bennet
*Attorney, Agent, or Firm*—Wood, Phillips, Mason, Recktenwald & VanSanten

[57] ABSTRACT

A system comprising a high pressure gas reservoir, a turbine, a compressor, a low pressure reservoir, a heat exchanger and flow control structure such as valves, etc. The high pressure reservoir is in heat exchange relationship with ambient air and delivers fluid at ambient temperature to a turbine. Spent fluid from the turbine exhausts and is brought into heat exchange relationship with the compressor. The compressor exhaust is at a temperature above that of the turbine exhaust. The exhaust, which is heated by the compressor, is then delivered to a low pressure reservoir which is in heat exchange relationship with ambient air and from there the exhaust heated by the compressor is delivered to the compressor inlet.

13 Claims, 3 Drawing Sheets

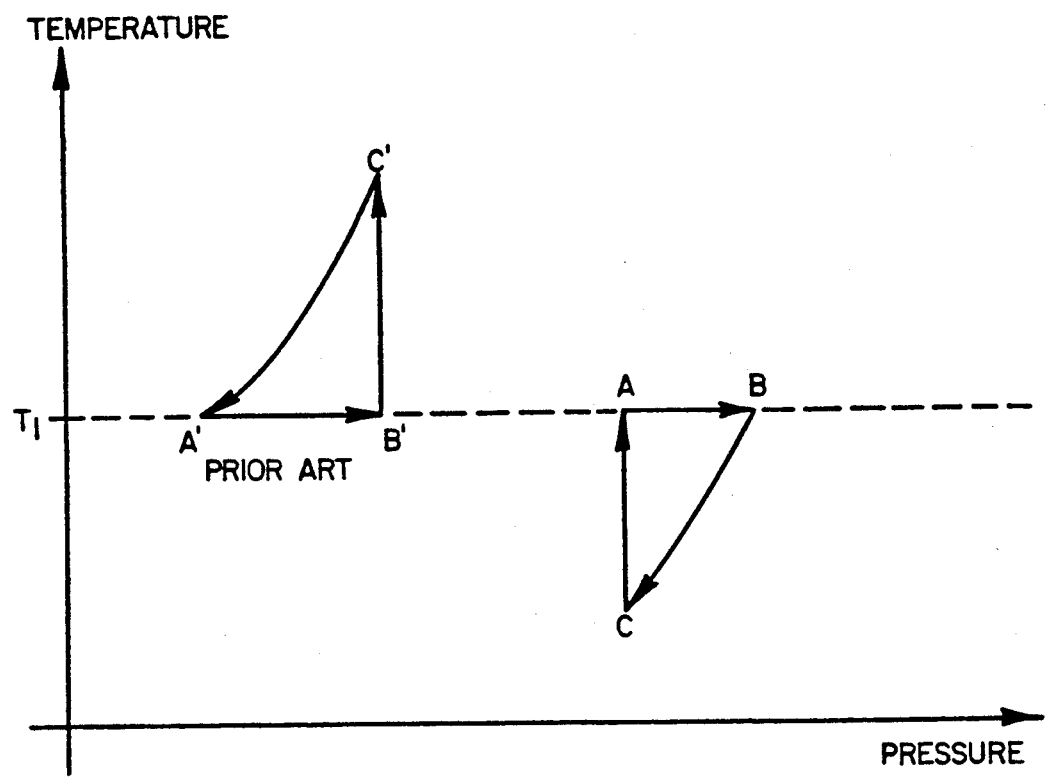
FIG. 3
FIG. 4
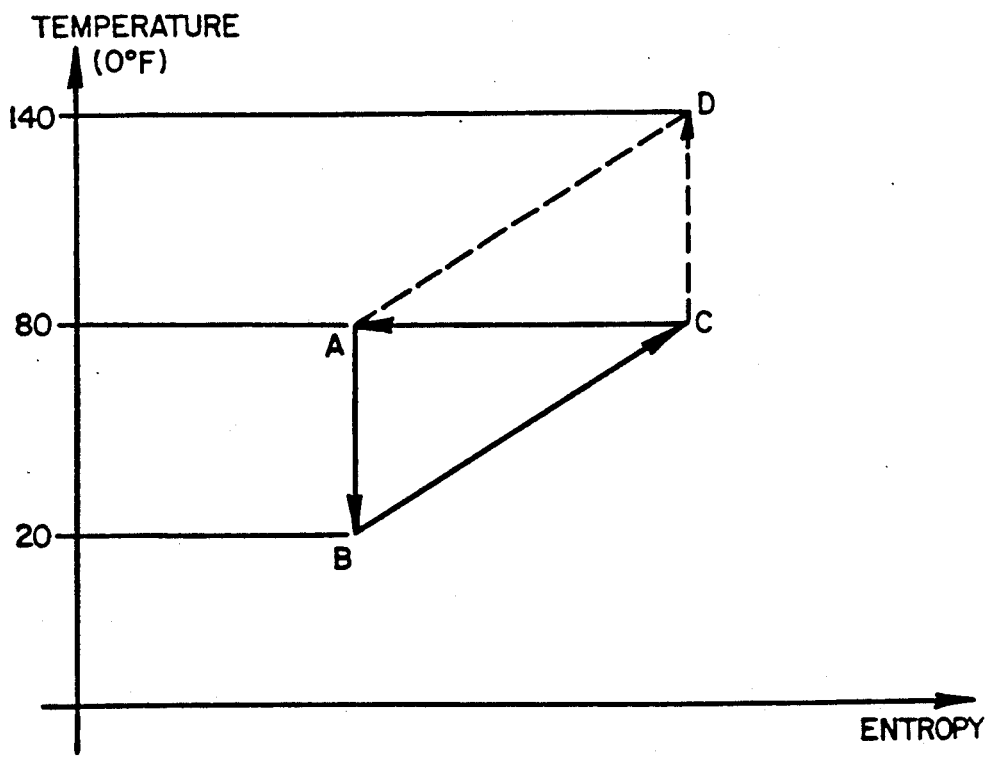

MAXIMUM AMBIENT CYCLE

CROSS REFERENCE

This application is a continuation-in-part of application Ser. No. 940,449, filed Dec. 11, 1986, now abandoned, to Thomas L. Cosby entitled Maximum Ambient Cycle.

FIELD OF THE INVENTION

This invention relates to work producing cycles and, more particularly, to a high efficiency system with a working fluid that exchanges heat with ambient conditions and a heat exchange mechanism with a turbine and compressor wherein turbine exhaust is used to reduce compressor work.

BACKGROUND ART

A conventional system for developing a power cycle typically comprises a boiler, turbine, condenser and pump. Heat is supplied to the boiler by a fossil fuel to convert an operating fluid into a high pressure vapor or gas for use as the working medium. The vapor is expanded in the turbine to produce a work output. In a heat rejection mechanism for the cycle, exhaust vapor from the turbine enters the condenser wherein sufficient heat is removed to condense the vapor. Saturated liquid is delivered to a pump, which raises the pressure to the saturation pressure corresponding to the boiler temperature and thereafter the liquid is delivered to the boiler where the cycle repeats.

Standard systems use a heat source and heat sink to establish a temperature gradient to create heat flow. With a temperature differential created, a working fluid is caused to flow as a result of pressure and/or volumetric differential.

The applicability of any system hinges on the efficiency of the cycle. One apparent flaw in prior art systems is the fact that high work input is a necessary result of creating a differential by developing very high pressures and temperatures through the addition of heat. Generally, in prior art systems, the amount of work required to compress the vapor back to its saturation pressure has been greater than the work extracted from the system through the turbine. The work input that is required to compress the vapor is functionally dependent upon a temperature differential established to generate heat flow in the system. Heretofore, efforts have been made to improve efficiency by utilizing latent or waste heat to reduce heat input.

SUMMARY OF THE INVENTION

A principal objective of the present invention is to provide a system wherein the operating medium is pressurized in the cycle while consuming a minimal amount of the work produced by expansion of the operating medium. To accomplish this end, vapor is cooled during the compression portion of the cycle simultaneously as compression of the operating medium is being carried out. As a result, compression work is minimized. Additional cooling may be performed by standard A/C techniques.

The invention also contemplates input heat reduction by using ambient air as a heat exchange medium. Whereas prior art power cycles heat an operating fluid above ambient temperature to produce a temperature differential, the present invention contemplates a cycle wherein the working fluid is maintained at or near ambient temperature. For example, the ambient temperature may be approximately 80° F. Accordingly the heat input is substantially reduced over the input required in conventional power cycle systems.

The fluid circuit of the invention comprises a turbine for producing a work output in which the working fluid comes in at an incoming temperature and pressure and is exhausted at a first temperature and pressure below the incoming temperature and pressure; a compressor downstream of the turbine; first means for affecting heat exchange between the fluid from the turbine that is exhausted at said first temperature and the the compressor so that the fluid in the compressor is cooled and the exhaust fluid from the turbine heated by the compressor through heat exchange therewith to a temperature above the first temperature; a reservoir for working fluid from the turbine heated by the compressor to the reservoir; means for delivering fluid from the reservoir to the compressor for compression thereby, a second reservoir; means for delivering fluid compressed by the compressor to the second reservoir; and means for delivering fluid from the second reservoir to the turbine.

More specifically, the present system comprises a high pressure gas reservoir, a turbine, a compressor, a low pressure reservoir, a heat exchanger and flow control structure such as valves, etc. The high pressure reservoir is in heat exchange relationship with ambient air and delivers fluid at ambient temperature to a turbine. Spent fluid from the turbine is brought into heat exchange relationship with the compressor which is at a temperature above that of the exhaust fluid. The compressed vapor is thus maintained at a temperature below that which it would normally be at in a conventional compression operation. The turbine exhaust, which is heated by the compressor, is then delivered to a low pressure reservoir, which is in heat exchange relationship with ambient air, and from there the fluid is delivered to the compressor inlet, the fluid is compressed in the compressor, and the fluid is directed back to the high pressure reservoir.

BRIEF DESCRIPTION OF THE DRAWINGS

FIG. 3 is a graphical representation of pressure versus temperature for a prior art power producing cycle and a power producing cycle according to the invention;

FIG. 4 is a graphical representation of entropy versus temperature for a power producing cycle according to the present invention;

DETAILED DESCRIPTION OF THE DRAWINGS

Figure 1:
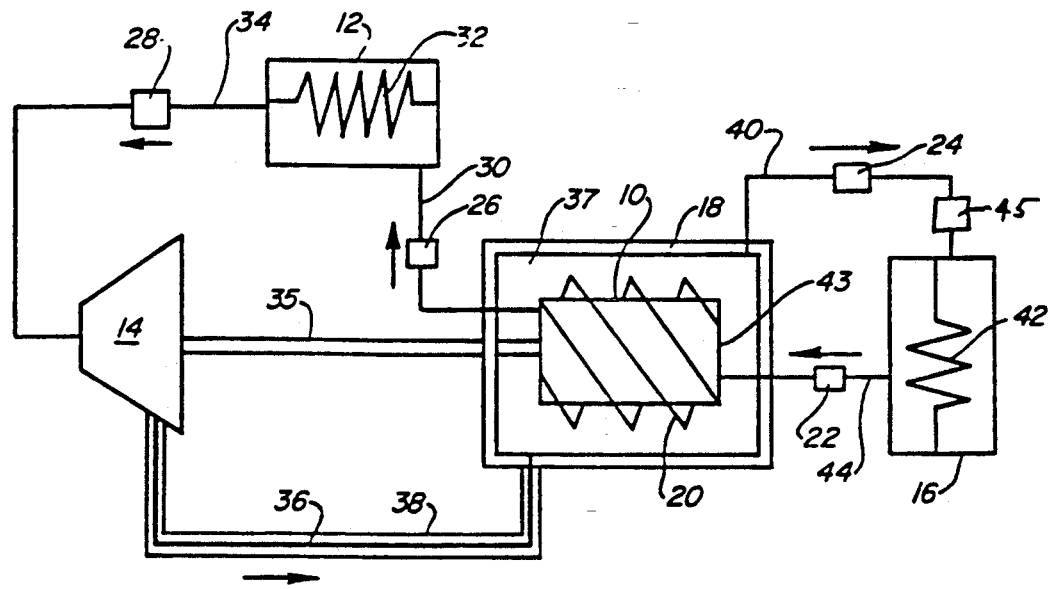
FIG. 1 is a schematic representation of a system for producing a power cycle according to the invention.

Referring initially to FIG. 1, a system according to the invention is shown schematically and comprises a compressor 10, a high pressure reservoir 12, a turbine 14 and a low pressure reservoir 16. The compressor 10 is surrounded by a cooling jacket 18 and has disposed peripherally therearound helically wound cooling flights 20. Valves 22, 24, 26, 28 are installed through the system to control the fluid flow volume and pressure throughout the system.

To initiate a cycle, the entire system is first evacuated. A pressurized fluid is injected into the system in sufficient volume to maintain working pressure until the compressor begins returning pressurized vapor. A suitable fluid for use in the system is FREON R-22 refrigerant (FREON is a registered trademark for fluorocarbon refrigerant owned by E. 1. DuPont De Nemours & Co.).

Pressurized vapor is delivered through valve 26 and conduit 30 to reservoir 12. The high pressure reservoir 12 has a heat exchanger 32 to equalize the temperature within the high pressure reservoir 12 and the ambient temperature.

From the high pressure reservoir 12, the fluid is delivered through conduit 34 and valve 28 to the turbine 14. In the turbine the fluid is expanded. Work is extracted by any of a number of conventional power take-off devices connected as by drive shafts (not shown) to the turbine output shaft 34. The shaft 34 also drives the compressor 10.

Exhaust fluid from the turbine is delivered through conduit 36 to a chamber 37 inside the cooling jacket 18 surrounding the compressor 10. To maintain the exhaust fluid in its cooled state, an insulating layer 38 surrounds the conduit 36 communicating between the turbine and chamber 37 within the cooling jacket 18.

The incoming exhaust fluid surrounding the compressor is at a lower temperature than the fluid in the compressor 10. Heat exchange with the compressor is enhanced by the provision of the flights 20 about the compressor 10.

The fluid exhausted from the turbine, after being heated by the compressor, is delivered through a conduit 40 and valve 24 into the low pressure reservoir 16. Heat exchange between the low pressure reservoir and ambient air is effected through a heat exchange element 42 within the low pressure reservoir 16.

Fluid is delivered from the low pressure reservoir 16 to the compressor inlet 43 through a conduit 44 and valve 22. The compressor pressurizes the fluid from the low pressure reservoir and delivers the same to the high pressure reservoir through conduit 30 and valve 26 for completion of the fluid circuit. Also included is means 45 for providing the system with any required work or heat to keep the system in continuous operation. These means 45 may be placed throughout the system, and where needed, and the placement of these means 45 is not definitive, only illustrative.

EXAMPLE NO. 1

Following are exemplary figures of pressures and temperatures for the operating fluid using the system of FIG. 1 with FREON R-22 refrigerant as the working fluid, assuming an ambient temperature of approximately 80° F. In the high pressure reservoir 12, the working fluid is maintained at 158 psia. Enthalpy drop across a turbine will yield 83 psia and 40° F. for the exhaust. After effecting heat exchange with the compressor, the fluid is at 83 psia and a temperature above 40° F. Heat exchange with the ambient air maintains the low pressure reservoir at 80° F. The fluid is pressurized in the compressor to approximately 158 psia. Any additional work or heat required by the system to maintain thermal equilibrium may be added by conventional means (heat exchangers, supplemental compressors, etc.) although the amount of work or heat needed to be added will be significantly reduced in comparison to conventional systems due to the configuration of this invention.

EXAMPLE NO. 2

Following are a separate set of figures of pressures and temperatures for the operating fluid using the system of FIG. 1 with FREON R-22 refrigerant as the working fluid, assuming an ambient temperature of approximately 80° F. Enthalpy (H) values are also identified for the system. In the high pressure reservoir 12, the working fluid is maintained at 110 psia. H=113.8 BTU/LB. The turbine exhaust is at 56 psia and 20° F. H=106.5 BTU/LB. After effecting heat exchange with the compressor, the fluid is at 56 psia and 75° F. H=115.6. In the low pressure reservoir, H=116.5 BTU/LB. The fluid is pressurized in the compressor to approximately 110 psia and the temperature of the compressor exhaust is approximately 90° F. H=115.6 BTU/LB. Additional work or heat required by the system may be supplied so as to keep the system continuous. The pressures and temperatures used are approximate, but do indicate that the efficiency of the system is enhanced over the prior art.

The cycle of FIG. 1 is illustrated graphically in FIG. 3 with the temperature represented on the Y axis and pressure on the X axis. Line AB represents the compression stage, which occurs at a constant temperature, T1 or ambient temperature. Expansion in the turbine is indicated by the line BC. Compressor cooling and reheating of the turbine exhaust is accomplished through heat exchange with ambient air and is indicated by line CA.

Flow of cool turbine exhaust lowers the temperature of the compressor and vapor to minimize enthalpy increase and thereby work input. It can be seen that the temperature of the fluid throughout the cycle is maintained generally at or near ambient temperature. Consequently, the work input to the system to establish a disequilibrium is less than required in a conventional system, as shown graphically also in FIG. 3.

In the prior art cycle, e.g. a Rankine cycle, compression is accomplished by a pump. The compression stage is represented in FIG. 3 as line A'B'. To establish a temperature differential, the prior art system is heated as by the burning of a fossil fuel to elevate the temperature from point B1 to point C1 at constant pressure. Fluid expansion is shown as line C'A'. Substantial heat input is required to pressurize the fluid to the temperature at point C'.

The cycle of FIG. 1 is illustrated graphically in Fig. 4 with the temperature represented on the Y axis and entropy on the X axis. At point A, entropy (S) equals 0.2250± and enthalpy (H) equals 114 ± BTU/LB. Line AB represents turbine expansion. At point B, S equals 0.2250 and H equals 106± BTU/LB. and the pressure equals 56 psia. Line BC represents the heat exchange between turbine exhaust and the compressor 10. At point C, S equals 0.2443± and H equals 116±BTU/LB. Line CD shows isentropic compression and at point D, H equals 124.7 BTU/LB. at 110 psia. Line DA represents the cooling portion of the cycle in the adiabatic compressor. Line CA represents isothermal compression as performed in this cycle.

Figure 2:
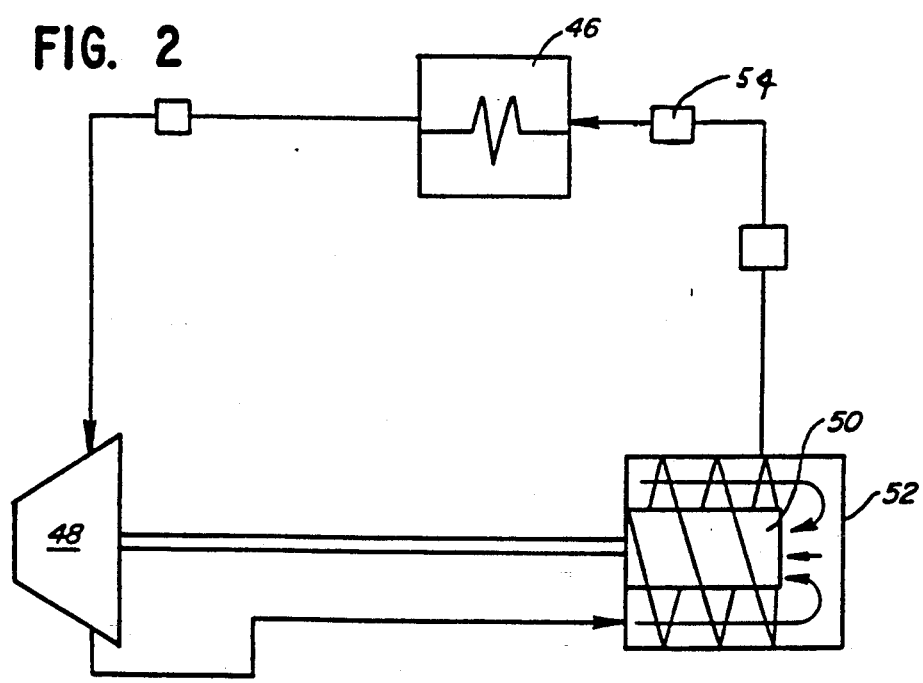
FIG. 2 is a schematic representation of an alternative system for a power cycle according to the invention.

A modified system according to the invention is shown in FIG. 2. The system comprises, as the system in FIG. 1, a high pressure reservoir 46, a turbine 48 and compressor 50. The distinction in the system in FIG. 2 is that the compressor is enclosed within a low pressure receiving chamber 52 which obviates the requirement of a separate, low pressure reservoir as in the FIG. 1 system. Also included are means 54 for providing the system with whatever work or heat is required to keep the system continuous. In all other respects, the system in FIG. 2 operates as the system in FIG. 1.

Figure 5:
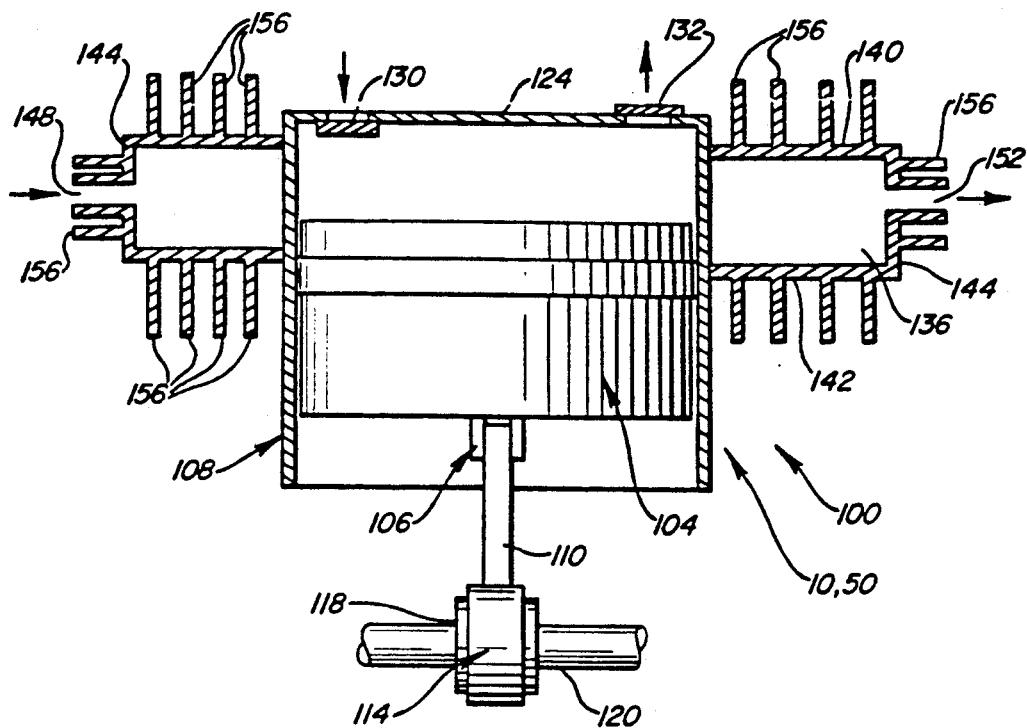
FIG. 5 is a cross-sectional schematic representation of a compression piston assembly with a cooling jacket for effecting cooling of the compressor as an operating medium is being compressed thereby.
Figure 6:
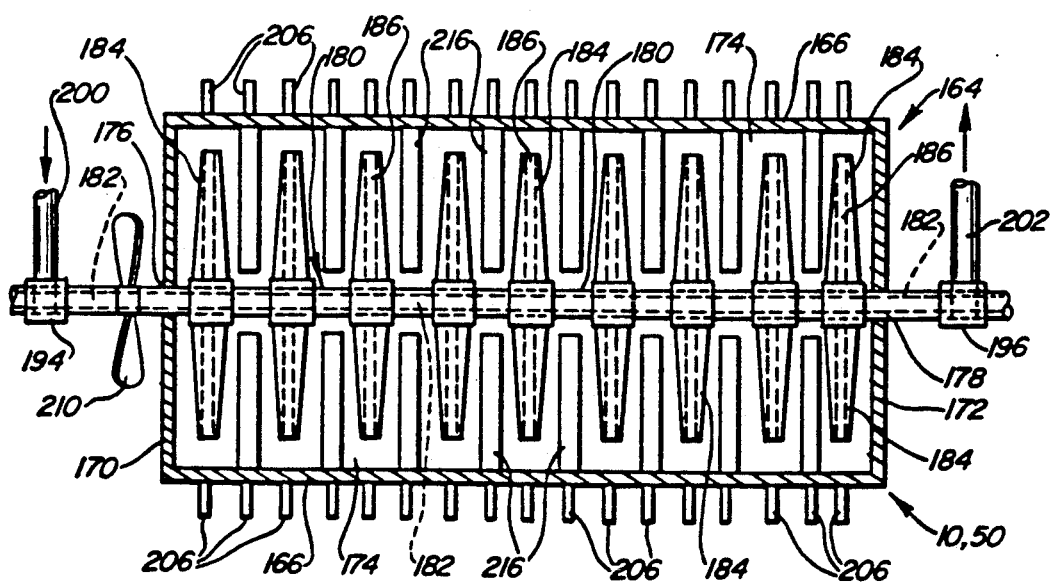
FIG. 6 is a cross-sectional view indicating schematically a multi-stage, rotary, centrifugal compressor with structure for cooling the compressor during a compression operation.

To cool the compressor 10, 50 as compression is occurring therein, a compressor structure such as that shown in FIGS. 5 and 6 can be utilized.

As shown in FIG. 5, the compressor 10, 50 (indicated generally in FIGS. 1 and 2) includes a piston-and-cylinder assembly 100 having a piston 104 operating reciprocatively in a cylinder 108. The piston 104 is coupled at 106 to a connecting rod 110 which is, in turn, attached at 114 by means of a bearing assembly 118 to a crank shaft 120, in a manner well-known in the art.

A wall 124 at the end of the cylinder 108 is provided with an intake valve 130 and an exhaust valve 132, also in accordance with principles known in the art. Surrounding the cylinder wall 124 of the cylinder 108 and in fluid flow heat exchange communication therewith is an annular, cylinder-cooling channel 135 having upper and lower walls 140, and 142 joined by a bridging lateral wall 144. The latter is provided with an inlet port 148 for ingress of a cooling fluid, and with a diametrically opposed discharge port 152 for exhausting the cooling fluid. Radiation or heat dissipation fins or ribs 156 are connected to and extend normally of the walls 140, 142 and outwardly of the wall 144 to enhance cooling during circulation of the compressor-cooling vapor through the cooling channel 136.

It is a feature of the method of the invention that the cooling of the compressor is conducted concurrently or simultaneously with the actual compression being effected in the piston-and-cylinder compression assembly 100.

In FIG. 6 a multi-stage, rotary, centrifugal compressor 10,50 is shown. This is provided with cooling structure for facilitating operation in accordance with the principles of the present invention. As depicted schematically in FIG. 6, the rotary compressor 10, 50 has a generally cylindrical casing or housing 164 having a tubular wall 166 with opposed end walls 170 and 172 defining a chamber 174. Extending coaxially through the casing 164 and journaled for rotation at 176 and 178 in opposed end walls 170 and 172 of the housing 164 is a rotatable hollow shaft 180 defining coaxial internal ducts or passages 182. A plurality of axially spaced blades 184 project radially outwardly of the shaft 180 and are supported on the shaft 180 for rotation therewith.

The blades 184 have internal fluid passages 186 which are in fluid-flow communication with the internal fluid-conducting passage 182 in the shaft 180. Cooling fluid is introduced into and discharged from the assembly by means of fluid inlet and fluid outlet sleeves 194 and 196 and pipe stubs 200 and 202 connected at opposite ends of the hollow shaft 180.

Dissipation of compressor-derived heat is facilitated by means of ribs or fins 206 attached to and projecting radially outwardly of the tubular wall 166 of the compressor housing 164. A fan blade 210, secured on the rotating shaft 180, further enhances heat dissipation.

The multi-stage, rotary, centrifugal compressor 10, 50 has a series of fixed, disc-like blades 216 fastened to the cylindrical wall 166 interiorly thereof and projecting radially inwardly toward the central shaft 180. As shown, the fixed blades 216 are interposed between adjacent, rotatable blades 184.

To understand the basic operational concept and where the system gets its energy, a brief discussion of the theory of availability is in order. Availability is defined as "the maximum work which can be delivered to things other than the system and medium by the two when unaided by any changes in any external things." (See Keenan, Jos. H., "Thermodynamics", John Wiley & Sons, N.Y., N.Y., 1941, P. 426). If a system is in any state except the "dead" state, a spontaneous change will occur, and no work need be supplied from any source external to the system and medium in order to cause the change. The maximum value of work which can be produced by the system and medium is not less than zero, or $W_{max} \geq 0$.

To make the system operation continuous, it is necessary to maintain a state of non-equilibrium. The present system contemplates creating a state of non-equilibrium, maintaining that state, and realizing high efficiency.

To establish non-equilibrium, all air is evacuated from the system and a measured charge of FREON R-22 is injected into the high pressure reservoir at ambient temperature of 80° Fahrenheit. (At 80° F. the superheated pressure is 110 psia).

To maintain the state of non-equilibrium it is necessary to have a low pressure receiver and means for evacuating the low pressure receiver at a rate equal to the mass flow into the receiver. In this system, which utilizes a pressure differential, a high pressure source and a low pressure sink (receiver), there are necessary components: first, a turbine engine which requires a steady flow of fluid at high pressure and a region of low pressure into which the fluid may be exhausted; and second, a compressor "engine" which is the reverse of the turbine engine.

It should be noted that flow of heat is not required for the operation of a turbine. In fact, the ideal engine or turbine is an adiabatic device. For steady flow into and out of a turbine having a reservoir and a receiver in input and discharge lines, respectively, that are large enough (or constant high and low pressure maintained) to insure steady conditions at a first section preceding the inlet receiver and at a second section following the discharge receiver, the energy equation of steady flow can be written in the form:

$$h_1 + \frac{V_1^2}{2g} = \frac{V_2^2}{2g} + W_x - Q + h_2$$

Where h denotes the enthalpy per unit mass of fluid entering at the first section, and Q the heat entering the fluid from outside per unit mass of fluid entering at the first section. In general, $V^2/2g$ is small at the first and second sections. Moreover Q is seldom of significant magnitude. Therefore the equation becomes $$h_1 = h_2 + W_x$$

If two of the quantities are known, the third can be calculated.

To realize highest efficiency from the cycle, it is necessary to 1) obtain work from the turbine from a pressure differential; 2) maintain the pressure differential by evacuating the low pressure receiver of turbine exhaust $$\left(\begin{array}{c} \text{mass flow} \\ \text{turbine} \end{array} = \begin{array}{c} \text{mass flow} \\ \text{compressor} \end{array}\right);$$

3) reduce the compressor work required by isothermal heat removal or cooling during the compression portion of the cycle; 4) establish initial high pressure conditions; 5) internally accomplish heat transfer from high pressure, high temperature compression to low pressure, low temperature turbine exhaust; and 6) maintain thermal equilibrium by atmospheric interaction and minimal work and/or heat addition to the system.

The cycle of the present invention is characterized by extraordinary high efficiency and as being non-polluting and operable without exhaustion of finite resources. A practical feature of the invention is that the apparatus may be assembled, for the most part utilizing "off the shelf" components which are presently available.

The foregoing detailed description was made for purposes of demonstrating the inventive structure and the operation thereof, with no unnecessary limitations to be understood therefrom.

I claim:

1. A fluid circuit for producing work comprising:
 a turbine for producing a work output,
 said turbine having means for causing expansion of a working fluid at an incoming temperature and pressure and exhausting working fluid at a first temperature and pressure below said incoming temperature and pressure;
 a compressor downstream of the turbine;
 first means for effecting heat exchange between the fluid from said turbine that is exhausted at said first temperature and the compressor so that the fluid in the compressor is cooled and the exhaust fluid from the turbine is heated by the compressor through heat exchange therewith to a temperature above said first temperature;
 a reservoir for fluid from said turbine heated by the compressor;
 means for delivering fluid heated by the compressor to the reservoir;
 means for delivering fluid from the reservoir to the compressor for compression thereby;
 a second reservoir;
 means for delivering fluid compressed by the compressor to the second reservoir; and
 means for delivering fluid from said second reservoir to said turbine.

2. The work producing fluid circuit according to claim 1 including means to effect heat exchange between said reservoirs and a supplemental energy source, as necessary, to maintain the circuit in continuous operation.

3. The work producing fluid circuit according to claim 1 including means connecting the turbine to drive the compressor.

4. The work producing fluid circuit according to claim 1 wherein said second reservoir is a high pressure reservoir downstream of the compressor between the turbine and the compressor, and means are provided to effect heat exchange between said high pressure reservoir and a supplemental energy source, as necessary, to maintain the circuit in continuous operation.

5. The work producing fluid circuit according to claim 1 wherein said reservoir is defined by a jacket surrounding said compressor.

6. A method of operating on a fluid to produce work in a system having a compressor and a turbine comprising the steps of;
 delivering operating fluid to the turbine at an incoming pressure and temperature to develop a work output and produce exhaust fluid at a temperature and pressure below the incoming pressure and temperature;
 cooling the compressor with exhaust fluid from the turbine;
 delivering operating fluid that has exhausted from the turbine and exchange heat with said compressor to a fluid inlet on the compressor for compression thereby;
 compressing operating fluid delivered through the compressor inlet in the compressor;
 delivering operating fluid compressed by the compressor to said turbine; and
 introducing additional energy, as necessary, to the system to permit the system to continuously operate.

7. The method according to claim 6 further comprising the step of maintaining the operating fluid at a substantially constant temperature as it compressed in said compressor.

8. The method according to claim 6 wherein there is a high pressure reservoir and further including the steps of affecting heat exchange between the high pressure reservoir and ambient air and delivering operating fluid from the compressor to the high pressure reservoir prior to delivery of the operating fluid to the turbine.

9. The method according to claim 6 wherein there is a low pressure reservoir and further including the steps of delivering operating fluid that has exchanged heat with the compressor to the low pressure reservoir prior to delivery of the operating fluid to the compressor inlet and affecting heat exchange between the low pressure reservoir and ambient air so that the temperature of the operating fluid entering the compressor is substantially equal to ambient temperature.

10. The method according to claim 6 including the step of linking the turbine and compressor to each other so that they are operable together.

11. The method according to claim 6 comprising the steps of evacuating the system and thereafter charging the systems with pressurized operating fluid in vapor form of sufficient volume to activate the system and maintain a working pressure until the compressor begins returning pressurized vapor.

12. A method of operating on a working fluid in a system to produce work comprising the steps of:
 providing a fluid compressor and a turbine with a fluid inlet in said system;
 increasing the pressure of the working fluid in the compressor from a first pressure;
 expanding working fluid in the turbine to produce a work output and to reduce the pressure and temperature of working fluid coming into the turbine to a pressure and temperature for fluid exhausted by the turbine below the incoming fluid temperature and pressure;

maintaining the temperature of the working fluid substantially constant in the compressor as the pressure of the working fluid is increased by the compressor by using the fluid exhausted from the turbine to cool the compressor through heat exchange;

heating the fluid from the turbine by heat exchange with the compressor;

delivering fluid from the turbine heated by the compressor to the turbine inlet; and introducing additional energy, as necessary, to the system to permit the system to continuously operate.

13. The method according to claim 12 including the steps of providing a reservoir and delivering fluid heated by the compressor to the reservoir before delivery to the turbine.

* * * * *